United States Patent
Igarashi

(10) Patent No.: US 6,755,389 B2
(45) Date of Patent: Jun. 29, 2004

(54) FLOW REGULATION VALVE

(75) Inventor: Hiroki Igarashi, Honjo (JP)

(73) Assignee: Surpass Industry Co., Ltd. (JP)

( * ) Notice: Subject to any disclaimer, the term of this patent is extended or adjusted under 35 U.S.C. 154(b) by 0 days.

(21) Appl. No.: 10/311,265

(22) PCT Filed: Jun. 12, 2001

(86) PCT No.: PCT/JP01/04944

§ 371 (c)(1),
(2), (4) Date: Dec. 12, 2002

(65) Prior Publication Data

US 2003/0141470 A1 Jul. 31, 2003

(30) Foreign Application Priority Data

Jun. 14, 2000 (JP) .................... P 2000-179080

(51) Int. Cl.[7] .............................. F16K 7/04
(52) U.S. Cl. .............................. 251/5; 251/7
(58) Field of Search .................. 251/4, 5, 7, 8

(56) References Cited

U.S. PATENT DOCUMENTS

| | | | | |
|---|---|---|---|---|
| 2,876,937 A | * | 3/1959 | Wilson | 251/7 |
| 3,724,801 A | * | 4/1973 | Jackson | 251/7 |
| 4,548,382 A | | 10/1985 | Otting | |
| 4,635,897 A | * | 1/1987 | Gallant | 251/7 |
| 4,682,755 A | | 7/1987 | Bernstein et al. | |
| 4,824,072 A | * | 4/1989 | Zakai | 251/5 |
| 4,953,824 A | * | 9/1990 | Baumann | 251/8 |
| 5,441,231 A | * | 8/1995 | Payne et al. | 251/5 |
| 5,549,793 A | | 8/1996 | Hellstrom et al. | |
| 6,047,943 A | * | 4/2000 | Hussey | |

FOREIGN PATENT DOCUMENTS

| | | |
|---|---|---|
| CA | 2150629 | 2/1996 |
| DE | 195 22 488 A1 | 2/1996 |
| JP | 56-95667 | 2/1990 |
| JP | P2000-35145 A | 2/1990 |
| JP | 2-84071 | 6/1990 |
| JP | 4-252850 | 9/1992 |
| JP | 9-311726 | 12/1997 |
| JP | 11-37339 | 2/1999 |

OTHER PUBLICATIONS

Copy of International Search Report.

* cited by examiner

Primary Examiner—Paul J. Hirsch
(74) Attorney, Agent, or Firm—Thelen Reid & Priest LLP

(57) ABSTRACT

A flow regulating valve comprises a casing 1; a tube 10 which has elasticity and the both ends thereof are opened to an exterior, and is inserted and installed in the casing 1; and a pushing member 20 which changes an area of an aperture of the tube 10. The tube 10 has a double layered structure which is composed by unifying an inner tube 11 which is made of tetrafluoroethylene and an outer tube 12 which is made of teflon™ by adhesives. Furthermore, the pushing member 20 has diaphragms 21 and 22 provided in the casing so as to face with the tube 10, and a fluid pressure supplying portion 23 which moves the diaphragms to the tube side by supplying fluid pressure to one of surfaces of the diaphragms 21 and 22.

18 Claims, 3 Drawing Sheets

FLOW REGULATION VALVE

BACKGROUND OF THE INVENTION

1. Field of the Invention

The present invention relates to a flow regulating valve for regulating the flow rate of a fluid flowing through a flow passage.

2. Description of the Related Art

Flow regulating valves for regulating flow rates of fluids flowing flow passages are known.

Conventionally, a typical known flow regulating valve has a basic structure which is composed of a casing in which a flow passage is formed therein, a valve element which is installed in the casing and enables to change a cross-sectional area of an aperture of the flow passage, and a valve element regulating means which regulates moving amount of the valve element by using a screw mechanism, for example.

In the case of regulation of the flow rate of a fluid by a flow regulating valve, the regulation is performed by moving the valve element to approach or separate from a valve seat using a valve element regulator so as to set the cross-sectional area of the aperture of the flow passage to an appropriate value.

However, in this valve, since the flow passage formed in the casing has a sigmoid portion which is formed by a casing body and a cover, and the valve seat and valve element which face each other are installed in the flow passage as described above, the flow passage is winding and stagnation of the fluid is likely occur. Furthermore, since the flow passage is composed of a plurality of members, it is difficult to remove the fluid which has entered into gaps between these members. As a result, there is a problem in that the flow passage is difficult to clean.

For example, in a plant in which this valve is installed, in the cases of changing the kind of the fluid or performing periodic maintenance, the flow passage must be cleaned; however, this cleaning is very difficult and requires a lot of time if the valve as described above is installed in the flow passage.

Therefore, the flow passage which is made of a single member and does not have irregularities is needed in order to promote efficiency in the cleaning.

SUMMARY OF THE INVENTION

A flow regulating valve according to the present invention comprises a casing; a tube which has elasticity and both ends thereof are opened to the exterior, and is inserted and installed in the casing; and a pushing member which changes an area of an aperture of the tube.

According to this flow regulating valve, a flow passage which is made of a single member and does not have irregularities can be assured since the flow passage is formed by the tube. As a result, the flow passage in which stagnation of the fluid does not occur and cleaning thereof can easily be performed is assured, and therefore, efficiency in the cleaning can be promoted.

DETAILED DESCRIPTION OF THE PREFERRED EMBODIMENTS

Preferred embodiments of the present invention will be presented in the following with reference to figures.

Figure 1:
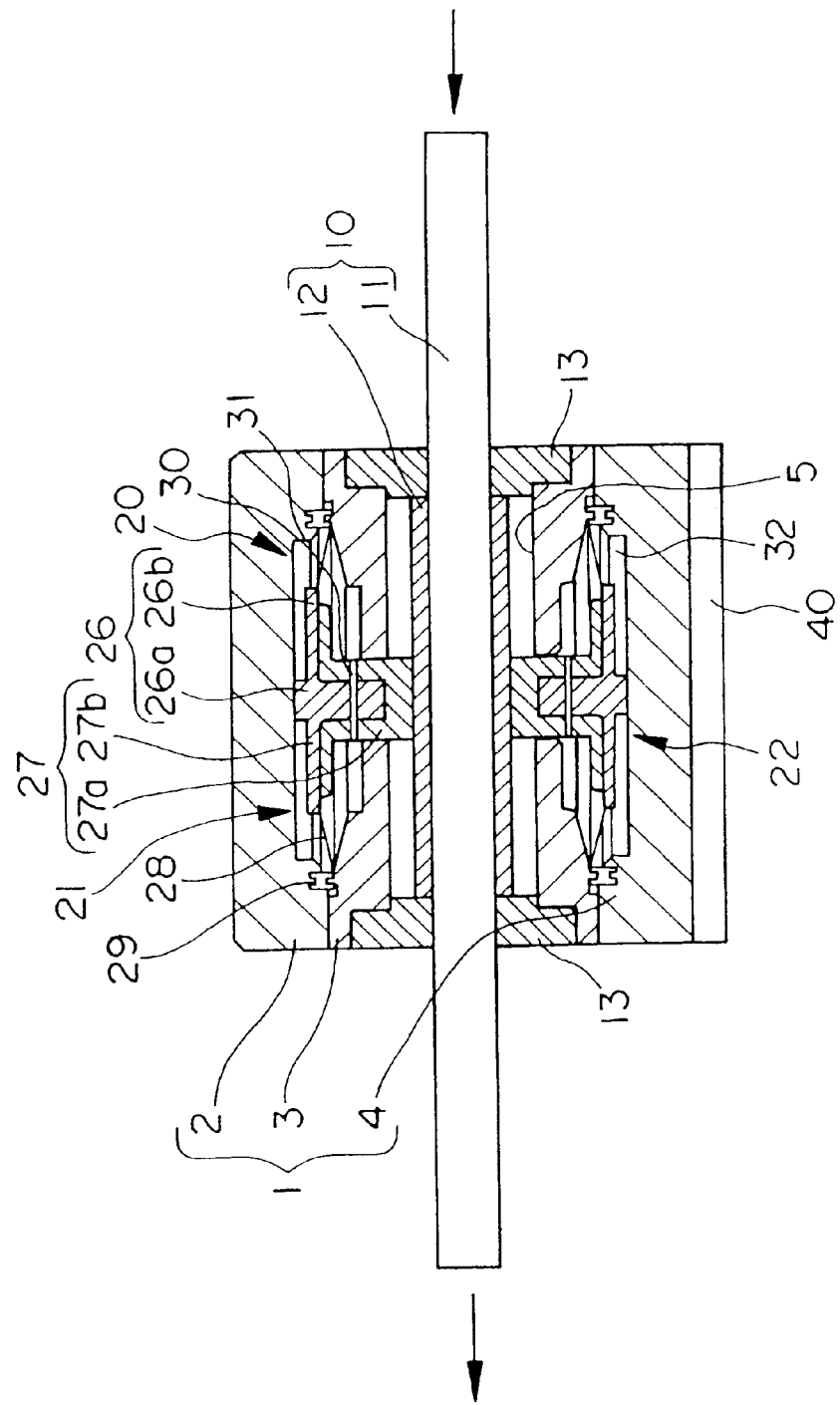
FIG. 1 is a cross sectional view of the flow regulating valve for explaining the flow regulating valve of the present invention.
Figure 2:
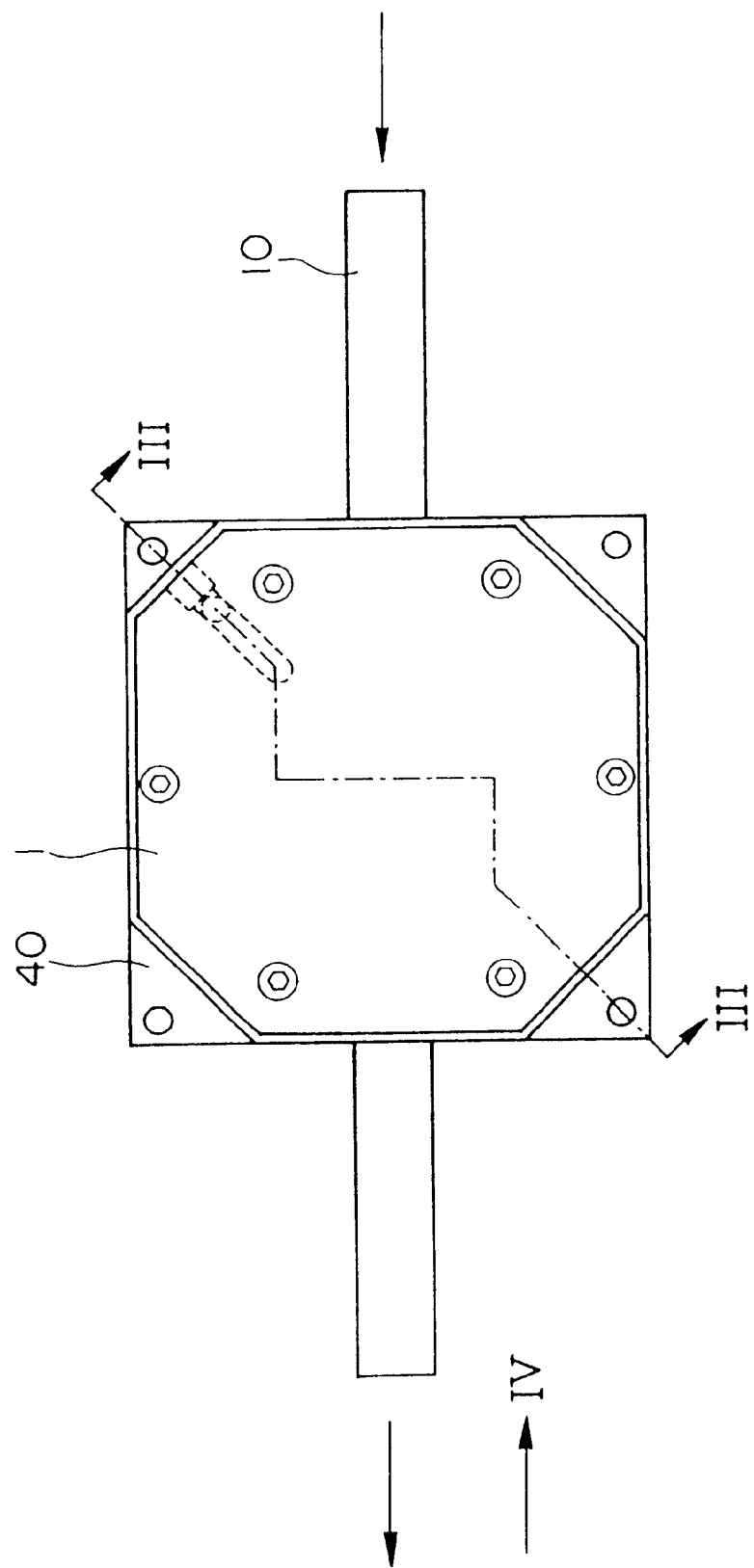
FIG. 2 is an outer plan view of the flow regulating valve for explaining the flow regulating valve of the present invention.
Figure 3:
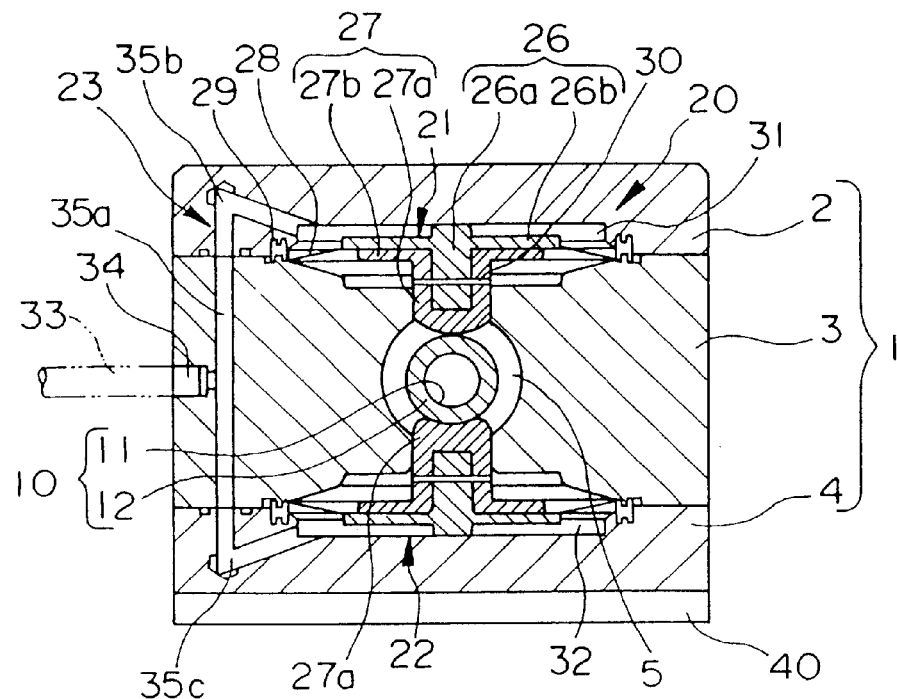
FIG. 3 is a cross sectional side view of the flow regulating valve shown in FIG. 2 along the line III—III.
Figure 4:
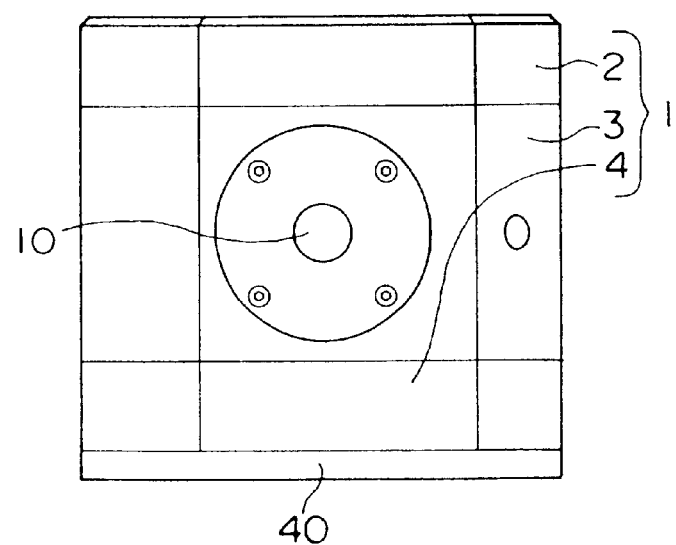
FIG. 4 is a side view of the flow regulating valve shown in FIG. 2 along the arrow IV.

FIGS. 1 and 3 are cross sectional views of the flow regulating valve for explaining the flow regulating valve of the present invention, and FIGS. 2 and 4 are side views for showing an exterior view of the flow regulating valve.

As shown in FIG. 1, a casing 1 is divided in three portions in a vertical direction, and is composed of an upper casing 2, a central casing 3, and a lower casing 4. In the central casing 3, a through hole 5 which passes through the casing from one side surface to the other side surface thereof is provided, and a tube 10 in which both ends thereof are opened to the exterior is inserted and installed in the through hole 5.

The tube 10 has a double layered structure which is composed of an inner tube 11 having high chemical resistance, and is made of tetrafluoroethylene for example; and an outer tube 12 which is positioned outside of the inner tube 11 and having high elasticity and restoring force and chemical resistance, and is made of teflon™ for example. These tubes 11 and 12 have unified structure by adhesion using adhesives.

Furthermore, a length of the outer tube 12 is determined so as to be housed in the through hole 5 of the central casing 3 and both ends thereof are contacted with caps 13 and 13 which are installed in open ends of the through hole 5, and as a result, the outer tube 12 and inner tube 11 which is united with the outer tube 12 are set in the casing 1 so as not to move along an axial direction thereof (right and left direction in FIG. 1). The inner tube 11 is connected with a piping which is not shown in the figures and transports highly acid or highly alkaline slurry, the flow of which is to be controlled.

In addition, reference numeral 20 is a pushing member which pushes an approximately central part of the tube 10 and changes an area of an aperture of this pushed part of the tube 10. The pushing member 20 is composed of upper and lower diaphragms 21 and 22 which are provided in the casing 1 so as to face with the tube 10 and a fluid pressure supplying portion 23 which moves the diaphragms 21 and 22 to the tube 10 side by supplying fluid pressure to one of the surfaces (outer surface) of the diaphragms 21 and 22.

The upper diaphragm 21 is installed in a space between the upper casing 2 and central casing 3, and the lower diaphragm 22 is installed in a space between the lower casing 4 and central casing 3.

Next, the upper diaphragm 21 will be explained. The upper diaphragm 21 is composed of a male portion 26 which has a pin portion 26a provided at a center thereof and a disc portion 26b provided at an outside thereof, a female portion 27 which has a bottom cylindrical portion 27a in which the pin portion 26a is inserted therein and a disc portion 27b provided at an outside thereof, and an elastic membrane portion 28 which has a deformable flat doughnut shape and an inner peripheral portion thereof is held in a gas tight manner between the male portion 26 and female portion 27. An outer peripheral portion of the membrane portion 28 which has a doughnut shape is attached onto a predetermined position of the central casing 3 which faces with the above space by a ring shaped holder 29. Furthermore, the male portion 26 and female portion 27 are held to each other by inserting a pin 30 while the pin portion 26a is inserted in the bottom cylindrical portion 27a.

A structure of the lower diaphragm 22 is basically the same as that of the upper diaphragm 21 and the explanation thereof is omitted.

The fluid pressure supplying portion 23 has two pressure chambers 31 and 32, and when the fluid is induced into the pressure chambers 31 and 32, the upper and lower diaphragms 21 and 22 are moved so as to approach and deform the tube 10 by pushing the tube 10 from the upper and lower sides.

Here, the bottom cylindrical portions 27a of the female portions 27 which are provided at the upper and lower sides of the tube 10 have different shapes respectively. That is, as shown in FIG. 3, in the bottom cylindrical portion 27a which is provided at the upper side of the tube, a face opposed to the tube 10 has a circular arc and convex cross section. In contrast, in the bottom cylindrical portion 27a which is provided at the lower side of the tube, a face opposed to the tube 10 has a circular arc and concave cross section. These circular arc and convex face and circular arc and concave face having shapes corresponding to each other, and therefore, according to cooperation of these faces, the tube 10 can be deformed so far as the area of the aperture thereof becomes approximate zero.

Furthermore, the fluid pressure supplying portion 23 is composed of an air connective opening 34 which is formed in the central casing 3 and connected to an air supply tube 33 extends from an air supply source which is not shown in the figures, an air supply path 35a which branches from the air connective opening 34 and extends upwardly and downwardly in the central casing 3, and air supply paths 35b and 35c which are respectively formed in the upper casing 2 and lower casing 4 so as to connect the air supply path 35a and pressure chambers 31 and 32.

Therefore, the air connective opening 34 functions as an air supply path which supplies air to the flow regulating valve from the air supply source which is not shown in the figures.

In addition, reference numeral 40 is a base plate for installing the flow regulating valve to the predetermined position.

Next, operation of the flow regulating valve which has the above structure will be explained.

Highly acid or highly alkaline slurry is supplied from piping and passes through the inner tube 11 of the flow regulating valve, and the flow rate thereof is regulated in accordance with cross-sectional area of the aperture of the inner tube 11.

That is, in the case of decreasing the flow rate of the slurry, increasing pressure of air which is induced into the flow regulating valve from the air supply source. This highly pressurized air passes through the air connective opening 34 and the air supply path 35a which are formed in the central casing 3, and the air supply paths 35b and 35c which are formed in the upper and lower casings 2 and 4, and induced into the upper and lower pressure chambers 31 and 32, and heighten air pressure in the pressure chambers 31 and 32. As a result, the upper and lower diaphragms 21 and 22 deform and move so as to approach the tube 10, and the tube 10 is pushed by the female portions 27 from upper and lower sides. Therefore, the tube 10 deforms so as to decrease the area of the aperture thereof at the portion which faces to the diaphragms 21 and 22, and consequently, the flow rate of the slurry which flows in the inner tube 11 decreases.

In contrast, in the case of increasing the flow rate of the slurry, decreasing pressure of air which is induced into the flow regulating valve from the air supply source. Then, air pressure in the upper and lower pressure chambers 31 and 32 which connect the air supply source through the air connective opening 34, the air supply path 35a, and the air supply paths 35b is decreased to the predetermined level. As a result, the upper and lower diaphragms 21 and 22 deform and move so as to separate from the tube 10, and the tube 10 deforms so as to return to an original cylindrical shape especially by restoring force of the outer tube 12. Therefore, the area of the aperture of the tube 10 at the portion which faces to the diaphragms 21 and 22 increases, and consequently, the flow rate of the slurry which flows in the inner tube 11 increases.

As described above, the flow rate of the slurry which flows in the inner tube 11 can be regulated in accordance with pressure of air from the air supply tube 33.

Furthermore, in the flow regulating valve which comprises the casing 1 and tube 10, since the flow passage is formed by the tube 10 which has unified structure, the flow passage which is made of a single member and does not have irregularities can be assured. Therefore, an approximate straight flow passage in which the stagnation of the fluid does not occur in comparison with the conventional flow passage which is composed of a plurality of members can be assured, and accordingly, the flow passage can easily be cleaned in a short time.

Furthermore, in the flow regulating valve, the tube 10 has a double layered structure in which the functions thereof are divided among the inner tube 11 and outer tube 12. That is, the tube 10 has a unified structure by adhering the inner tube 11 which contacts with the fluid and has high chemical resistance and the outer tube 12 which has high elasticity and restoring force. Therefore, as a whole, a tube which has high chemical resistance and has high elasticity and restoring force can be obtained.

In addition, in this tube 10, the inner tube 11 is made of tetrafluoroethylene which has high chemical resistance and the outer tube 12 is made of teflon™ which has high elasticity and restoring force and chemical resistance. That is, the inner and outer tubes 11 and 12 are made of the optimum materials for their functions.

Furthermore, in the flow regulating valve, the pushing member 20 is composed of the upper and lower diaphragms 21 and 22 which are provided so as to face with the tube 10 and the fluid pressure supplying portion 23 which moves the diaphragms 21 and 22 to the tube 10 side by supplying fluid pressure to one of the surfaces of the diaphragms 21 and 22, and the tube 10 is pushed by the diaphragms 21 and 22 from upper and lower sides as a result of induction of the fluid through the pressure supplying portion 23. Therefore, the area of the aperture of the tube 10 can easily be regulated in comparison with the case in which the tube is pushed from one side only.

Furthermore, since the pressurized air is supplied to the upper and lower diaphragms 21 and 22 by the fluid pressure supplying portion 23 which branches from one air connective opening 34, air with the same pressure can be supplied to the upper and lower diaphragms 21 and 22, and therefore, the well balanced movement of the upper and lower diaphragms 21 and 22 can be performed.

Moreover, since the casing 1 is divided in three portions in a vertical direction, the upper diaphragm 21 is installed in the space between the upper casing 2 and central casing 3, and the lower diaphragm 22 is installed in the space between the lower casing 4 and central casing 3; the installation of the diaphragms 21 and 22 in the casing 1 can easily be performed.

INDUSTRIAL APPLICABILITY

As described above, according to the present invention, since the flow passage is formed by the tube, the flow passage which is made of a single member and does not have irregularities can be assured. Therefore, the flow passage in which stagnation of the fluid is not induced and cleaning thereof easily can be performed can be assured. As a result, efficiency of cleaning can be promoted.

What is claimed is:

1. A flow regulating valve comprising:
   a casing;
   a tube which having elasticity, both ends thereof being externally open, the tube inserted and installed in said casings; and
   a pushing member which changes an area of an aperture of said tube, wherein said pushing member has a diaphragm provided in said casing so as to face with said tube, and a fluid pressure supplying portion which moves said diaphragm to said tube side by supplying fluid pressure to a surface of said diaphragm, and said diaphragm is provided at upper and lower sides of said tube, and said fluid pressure supplying portion which branches from one air connective opening supplies fluid pressure to these upper and lower diaphragms and moves these diaphragms to said tube side; and,
   wherein said casing is divided into three portions in a vertical direction, said tube is installed in a central casing, said diaphragms are installed between an upper casing and said central casing and between a lower casing and said central casing, respectively.

2. A flow regulating valve according to claim 1, wherein said central casing has a through hole which passes through said central casing from one side surface to another side surface thereof, and said tube is inserted in said through hole.

3. A flow regulating valve according to claim 2, wherein a length of said tube is determined so as to be housed in said through hole, and said tube has a double layered structure which is composed of an inner tube which has chemical resistance and an outer tube which is adhered on an outer surface of said inner tube so as to unite with said inner tube and has elasticity.

4. A flow regulating valve according to claim 2, wherein a space is provided between an outer surface of said tube and said through hole along an axial direction thereof.

5. A flow regulating valve according to claim 2, wherein caps which close open ends of said through hole are provided on said central casing.

6. A flow regulating valve according to claim 5, wherein both ends of said tube are contacted with said caps.

7. A flow regulating valve according to claim 1, wherein a base plate which is installed to a predetermined position is provided on said casing.

8. A flow regulating valve according to claim 1, wherein said tube has a double layered structure which is composed of an inner tube which has chemical resistance and an outer tube which is adhered on an outer surface of said inner tube so as to unite with said inner tube and has elasticity.

9. A flow regulating valve according to claim 8, wherein said inner tube and said outer tube are adhered by adhesives.

10. A flow regulating valve according to claim 8, wherein said inner tube is made of tetrafluoroethylene.

11. A flow regulating valve according to claim 8, wherein said outer tube is made of teflon™.

12. A flow regulating valve according to claim 1, wherein a pressure chamber which is connected with said fluid pressure supplying portion is provided at an outside of said diaphragm, and fluid pressure is supplied to said pressure chamber.

13. A flow regulating valve according to claim 1, wherein said diaphragms which are provided at upper and lower sides of said tube have faces which face each other, and one of the faces has a convex shape and the other face has a concave shape.

14. A flow regulating valve according to claim 13, wherein said faces have a circular arc shape in side view.

15. A flow regulating valve, comprising:
    a casing;
    a tube which having elasticity, both ends thereof being externally open, the tube inserted and installed in said casing; and
    a pushing member which changes an area of an aperture of said tube, wherein said pushing member has a diaphragm provided in said casing so as to face with said tube, and a fluid pressure supplying portion which moves said diaphragm to said tube side by supplying fluid pressure to a surface of said diaphragm and said diaphragm is provided at upper and lower sides of said tube, and said fluid pressure supplying portion which branches from one air connective opening supplies fluid pressure to these upper and lower diaphragms and moves these diaphragms to said tube side; and,
    wherein said diaphragm is composed of a male portion which has a pin portion, a bottom cylindrical portion in which said pin portion is inserted therein, and an elastic membrane portion which is provided at an outer periphery portion of said male portion.

16. A flow regulating valve according to claim 15, wherein said elastic membrane portion has a flat doughnut shape.

17. A flow regulating valve according to claim 16, wherein a ring shaped holder is provided at an outside of said elastic membrane portion, and this holder is fastened to said casing.

18. A flow regulating valve according to claim 15, wherein said tube has a double layered structure which is composed of an inner tube which has chemical resistance and an outer tube which is adhered on an outer surface of said inner tube so as to unite with said inner tube and has elasticity.

* * * * *